United States Patent
Böckenhauer et al.

(10) Patent No.: US 9,152,396 B2
(45) Date of Patent: Oct. 6, 2015

(54) MANAGING USER INTERFACE BUILDING BLOCKS

(75) Inventors: Jens Böckenhauer, Wiesloch (DE); Jens Ruths, Wiesloch (DE)

(73) Assignee: SAP SE, Walldorf (DE)

( * ) Notice: Subject to any disclaimer, the term of this patent is extended or adjusted under 35 U.S.C. 154(b) by 177 days.

(21) Appl. No.: 13/457,875

(22) Filed: Apr. 27, 2012

(65) Prior Publication Data

US 2013/0290877 A1    Oct. 31, 2013

(51) Int. Cl.
*G06F 3/048* (2013.01)
*G06F 9/44* (2006.01)

(52) U.S. Cl.
CPC ... *G06F 8/38* (2013.01); *G06F 8/34* (2013.01)

(58) Field of Classification Search
CPC ....... G06F 17/243; G06F 3/0481; G06F 8/38; G06F 17/2247; G06F 17/248; G06F 17/24; G06F 17/30; G06F 17/30159; G06F 9/325
USPC ......... 715/255, 762, 222, 223, 224, 221, 234; 717/109; 707/616, 999.102, 999.104
See application file for complete search history.

(56) References Cited

U.S. PATENT DOCUMENTS

| | | | | |
|---|---|---|---|---|
| 6,137,488 A | * | 10/2000 | Kraft et al. | 715/866 |
| 8,352,851 B1 | * | 1/2013 | Brinkman et al. | 715/227 |
| 2004/0036719 A1 | * | 2/2004 | Van Treeck | 345/763 |
| 2006/0107252 A1 | * | 5/2006 | Smuga et al. | 717/114 |
| 2008/0010586 A1 | * | 1/2008 | Betancourt et al. | 715/221 |
| 2008/0010591 A1 | * | 1/2008 | Good et al. | 715/255 |
| 2008/0109785 A1 | * | 5/2008 | Bailey | 717/109 |
| 2009/0006430 A1 | * | 1/2009 | Steinglass et al. | 707/100 |
| 2009/0138790 A1 | * | 5/2009 | Larcheveque et al. | 715/224 |

* cited by examiner

*Primary Examiner* — Amy Ng
*Assistant Examiner* — Sang H Kim
(74) *Attorney, Agent, or Firm* — Fish & Richardson P.C.

(57) ABSTRACT

Techniques for managing user interface (UI) building blocks (UIBB) include presenting, by a form repeater UIBB, initial UI representations of structured entities through a graphical user interface (GUI), each initial UI representation including one or more fields; receiving a trigger from a user through the form repeater UIBB; determining, based on the trigger, an event condition; and based on the event condition, replacing, by a substitute UIBB, an initial UI representation of a particular structured entity of the initial UI representations of the structured entities with a substitute UI representation of the particular structured entity.

23 Claims, 7 Drawing Sheets

FIG. 2A

▼ Flights ✎ Edit ⊡ New

0017

| Airline: | AA |
| Connection Number: | 0017 |
| Flight Date: | 26.01.0004 |

Plane Type: 747-400
Maximum capacity economy class: 150

| Airline: | AA |
| Connection Number: | 0017 |
| Flight Date: | 26.01.2011 |

Plane Type: 747-400
Maximum capacity economy class: 150

| Airline: | AA |
| Connection Number: | 0017 |
| Flight Date: | 23.02.2011 |

Plane Type: 747-400
Maximum capacity economy class: 150 — 202 Details — 385

| Airline: | AA |
| Connection Number: | 0017 |
| Flight Date: | 23.03.2011 |

Plane Type: 747-400
Maximum capacity economy class: 150 — 385

| Airline: | AA |
| Connection Number: | 0017 |
| Flight Date: | 20.04.2011 |

Plane Type: 747-400
Maximum capacity economy class: 150 — 385

FIG. 2B

| ▶ Flights | ✏ Edit | 🗋 New | | |
|---|---|---|---|---|
| 0017 | Airline: | AA | Plane Type: | 747-400 |
| | Connection Number: | 0017 | Maximum capacity economy class: | 385 |
| | Flight Date: | 26.01.0004 | | |

| | Airline: | AA | <u>150</u> Plane Type: | 747-400 |
|---|---|---|---|---|
| | Connection Number: | 0017 | Maximum capacity economy class: | 385 |
| | Flight Date: | 26.01.2011 | | |

<u>150</u>

{ 160

| | Airline: | AA | <u>155</u> Plane Type: | 747-400 | ◀ PREVIOUS | NEXT ▶ | 204 ↘ Close Details |
|---|---|---|---|---|---|---|---|
| | Connection Number: | 0017 | Maximum capacity economy class: | 385 | | | |
| | Flight Date: | 23.02.2011 | Airline local currency: | USD | | | |
| | Airline: | 422.94 | Booking total: | 192,949.71 | | | |
| | Occupied seats economy class: | 372 | Occupied seats business class: | 30 | | | |
| | Maximum capacity business class: | 31 | Occupied seats in first class: | 20 | | | |
| | Maximum capacity in first class: | 21 | | | | | |

} 160

| | Airline: | AA | <u>150</u> Plane Type: | 747-400 |
|---|---|---|---|---|
| | Connection Number: | 0017 | Maximum capacity economy class: | 385 |
| | Flight Date: | 23.03.2011 | | |

| | Airline: | AA | <u>150</u> Plane Type: | 747-400 |
|---|---|---|---|---|
| | Connection Number: | 0017 | Maximum capacity economy class: | 385 |
| | Flight Date: | 20.04.2011 | | |

FIG. 3

| Attributes of Swap UIBB | | | | Final Flags |
|---|---|---|---|---|
| Standard Attributes ← 302 | | | | |
| 304 { Component: [FPM_FORM_UIBB_GL2] | | Configuration Name: [FPM_TEST_SWAP_FORM] | | |
| Window Name: [FORM_WINDOW] | | Instance ID: [ ] | | |
| Swap Events ← 306 | | | | |
| 📁 Add Swap Event | | | | |
| FPM Event ID ← 308 | | Swap Type ← 310 | Event Condition ← 312 | |
| FPM_TEST_ACTION_CREATE | ▶ | Swap In | Raised By Own UIBB | |
| FPM_TEST_ROW_ACTION_DETAILS | ▶ | Swap In | Raised By Own UIBB | |
| FPM_TEST_ACTION_CLOSE_DETAILS | ▶ | Swap Out | Raised By Swap UIBB | |
| FPM_TEST_ACTION_NEXT | ▶ | Swap In | Raised By Swap UIBB | |

FIG. 4A

| Save | Cancel |
|---|---|
| ▶ Flights | ☐ New  Display As: [Form Repeater ▼]  Page: [Test Swap inplace Edit ▶] |

0017

| Airline: | AA |
|---|---|
| Connection Number: | 0017 |
| Flight Date: | 26.01.0004 |

150    Plane Type: 747-400
       Maximum capacity economy class: 385

| Airline: | AA |
|---|---|
| Connection Number: | 0017 |
| Flight Date: | 26.01.2011 |

}160    150    Plane Type: 747-400 }160
                Maximum capacity economy class: 385

| Airline: | AA |
|---|---|
| Connection Number: | 0017 |
| Flight Date: | 23.02.2011 |

150    Plane Type: 747-400    ← 402 [Edit]
       Maximum capacity economy class: 385

| Airline: | AA |
|---|---|
| Connection Number: | 0017 |
| Flight Date: | 23.03.2011 |

150    Plane Type: 747-400
       Maximum capacity economy class: 385

| Airline: | AA |
|---|---|
| Connection Number: | 0017 |
| Flight Date: | 20.04.2011 |

150    Plane Type: 747-400
       Maximum capacity economy class: 385

| Airline: | AA |
|---|---|
| Connection Number: | 0017 |
| Flight Date: | 18.05.2011 |

150    Plane Type: 747-400
       Maximum capacity economy class: 385

FIG. 4B

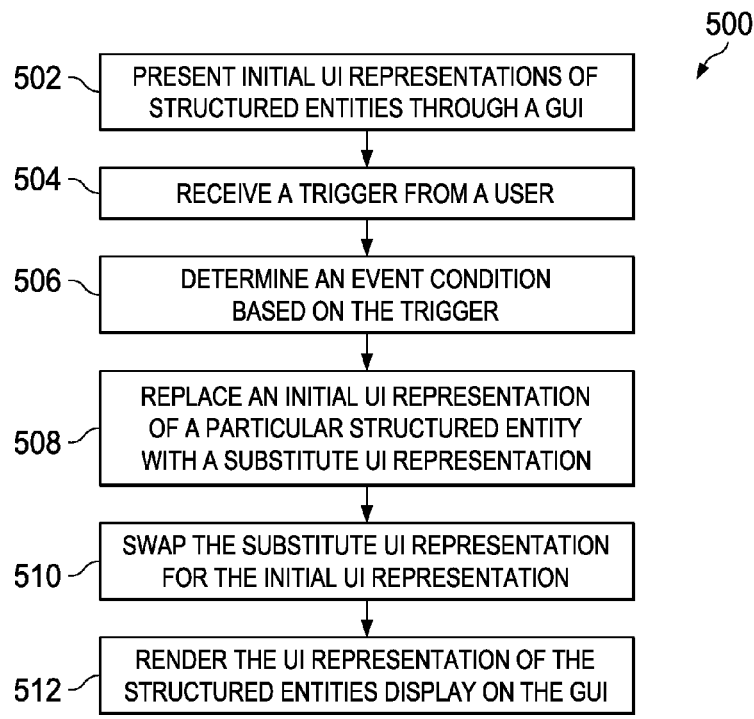
FIG. 5A
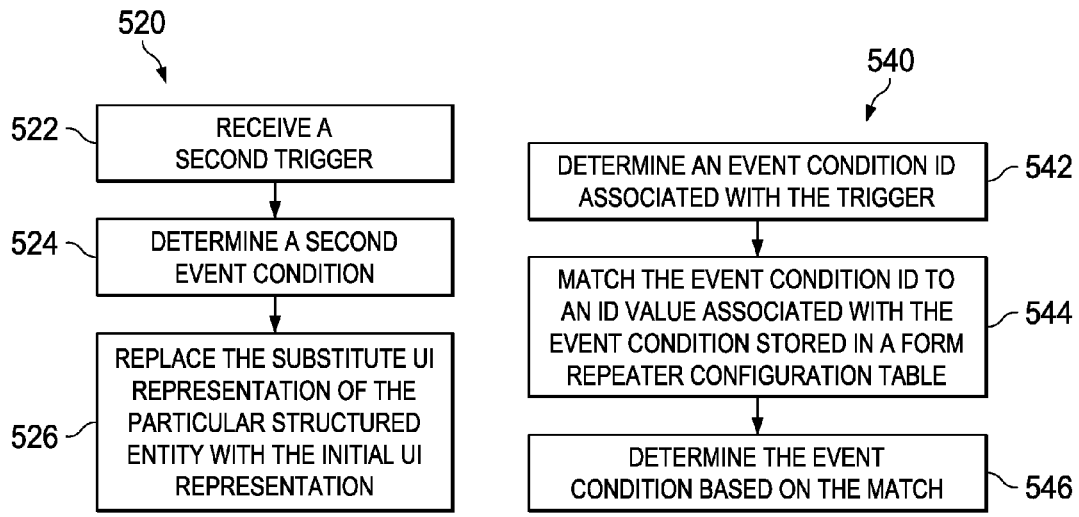
FIG. 5B
FIG. 5C

MANAGING USER INTERFACE BUILDING BLOCKS

TECHNICAL BACKGROUND

This disclosure relates to managing user interface (UI) building blocks (UIBB) and, more particularly, managing reusable and modular UIBBs.

BACKGROUND

Application developers can provide (e.g., build) user interfaces (UIs) with centrally provided development tools based on UI patterns. Such tools offer standard application patterns (sometimes referred to as "floorplans" such as a guided activity or an object-instance floorplan) as well as UI components (such as user interface building blocks (UIBBs)). Instead of providing UI specific programming, the application developers can implement data classes or exits, with the UI design being realized by configurations of the application patterns and the UI components, which assign the specific data provider classes. For communication between the individual UI components, the framework provides an event mechanism that for an event raised in a particular UI component, the event (or information about the event) is forwarded to other UI components, and in turn, to their data provider class so that application code can provide a response accordingly.

SUMMARY

This disclosure describes systems, methods, apparatus, and computer-readable media for managing user interface (UI) building blocks (UIBB). In some embodiments, a form repeater UIBB presents initial UI representations of structured entities (e.g., n initial UI representations of structured entities each at a respective index j) through a graphical user interface (GUI). Each UI representation includes one or more fields related to the respective structured entity. A trigger is received from a user through the form repeater UIBB via the GUI. In some examples, the trigger can be a selection of an input interface element (e.g., "clicking" a computer icon displayed on the GUI.) Based at least in part on the trigger, an event condition is determined. In some examples, the event condition can include activating a substitute UIBB at a certain index (e.g., "swapping in"). Based on the event condition (e.g., activating the substitute UIBB), the initial UI representation of a particular structured entity (e.g., at the index j) of the initial UI representations of the structured entities is replaced with a substitute UI representation of the particular structured entity by the substitute UIBB. In some examples, the substitute UI representation of the particular structured entity includes additional fields as compared to the initial UI representation of the particular structured entity.

In a general embodiment, techniques for managing user interface (UI) building blocks (UIBB) include presenting, by a form repeater UIBB, initial UI representations of structured entities through a graphical user interface (GUI), each initial UI representation including one or more fields; receiving a trigger from a user through the form repeater UIBB; determining, based on the trigger, an event condition; and based on the event condition, replacing, by a substitute UIBB, an initial UI representation of a particular structured entity of the initial UI representations of the structured entities with a substitute UI representation of the particular structured entity.

A first aspect combinable with the general embodiment further includes rendering the UI representations of the structured entities for display on the GUI, the UI representations including the substitute UI representation of the particular structured entity and at least a portion of the initial UI representations of the structured entities.

A second aspect combinable with any of the previous aspects further includes receiving a second trigger through the form repeater UIBB; determining, based on the second trigger, a second event condition; and based on the second event condition, replacing, by the form repeater UIBB, the substitute UI representation of the particular structured entity with the initial UI representation of the particular structured entity.

In a third aspect combinable with any of the previous aspects, determining, based on the trigger, an event condition includes determining an event condition ID associated with the trigger; matching the event condition ID to an ID value associated with the event condition stored in a form repeater configuration table; and determining the event condition based on the match between the event condition ID and the value stored in the form repeater configuration table.

In a fourth aspect combinable with any of the previous aspects, the form repeater configuration table includes a description of the substitute UI representation; the ID value associated with the event condition; and a type of the event.

In a fifth aspect combinable with any of the previous aspects, replacing, by a substitute UIBB, an initial UI representation of a particular structured entity of the initial UI representations of the structured entities with a substitute UI representation of the particular structured entity includes swapping the substitute UI representation of the particular structured entity with the initial UI representation of the particular structured entity based on the type of the event.

In a sixth aspect combinable with any of the previous aspects, the substitute UI representation of the particular structured entity includes at least one modifiable field, and at least a portion of the one or more fields of each initial UI representation of the structured entities includes non-modifiable fields.

Various embodiments of a form repeater UIBB and a substitute UIBB according to the present disclosure may have one or more of the following features. For example, for a form repeater with the substitute UIBB, it is clear for which structured entity the extended details are shown. Additionally, the form repeater UIBB and the substitute UIBB may further provide: a consistent look and feel throughout the software developer's application UIs (e.g., by implementing internal guidelines); reduction in the total cost of development (TCD) by replacing complex UI programming by simpler configuration and data provider class implementation; reduction in TCD by a modularized approach to UI construction allowing reusability of individual UI components (UI building blocks, UI data provider and transaction controller classes, etc.); reduction in TCD by providing a unified extensibility approach throughout software layers; reduction in total cost of ownership (TCO) by providing a unified adaptability approach for customer and partners; and lower cost for user training.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DESCRIPTION OF DRAWINGS

FIGS. 2A-2B illustrate example UI representations of structured entities;

FIG. 3 illustrate a form repeater configuration table;

FIGS. 4A-4B illustrate other example UI representations of structured entities; and FIGS. 5A-5C illustrate example methods for managing UI building blocks implemented by the example distributed computing system in FIG. 1.

DETAILED DESCRIPTION

Figure 1:
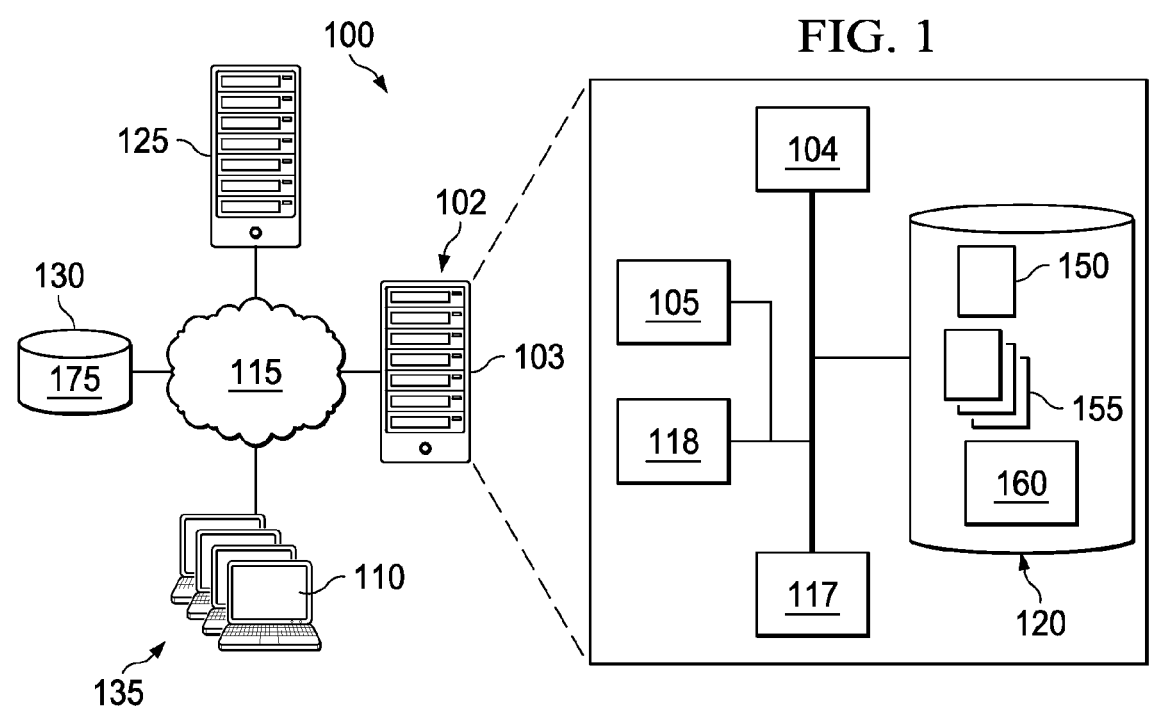
FIG. 1 illustrates an example distributed computing system operable to manage UI building blocks (UIBB)

This disclosure describes systems, methods, apparatus, and computer-readable media for managing user interface (UI) building blocks (UIBB). In some embodiments, a form repeater UIBB presents initial UI representations of structured entities (e.g., n initial UI representations of structured entities each at a respective index j) through a graphical user interface (GUI). Each initial UI representation includes one or more fields related to the respective structured entity. A trigger is received from a user through the form repeater UIBB via the GUI. In some examples, the trigger can be a selection of an input interface element (e.g., "clicking" a computer icon displayed on the GUI.) Based at least in part on the trigger, an event condition is determined. In some examples, the event condition can include activating a substitute UIBB at a certain index (e.g., "swapping in"). Based on the event condition (e.g., activating the substitute UIBB), the initial UI representation of a particular structured entity (e.g., at the index j) of the initial UI representations of the structured entities is replaced with a substitute UI representation of the particular structured entity by the substitute UIBB. In some examples, the substitute UI representation of the particular structured entity includes additional fields as compared to the initial UI representation of the particular structured entity.

FIG. 1 illustrates an example distributed computing system operable to manage a user interface building blocks (UIBB). For example, the illustrated environment 100 includes or is communicably coupled with an enterprise computing system 102, a host computing system 125, a repository 130, and one or more client computing devices 135 ("clients"), at least some of which communicate across a network 115.

The illustrated enterprise computing system 102 includes a server 103. In general, the server 103 stores one or more hosted applications, such as, for example, a form repeater UIBB 104 and a substitute UIBB 105, where at least a portion of the hosted applications are executed via requests and responses sent to users or clients within and communicably coupled to the illustrated environment 100 of FIG. 1. In some instances, the server 103 may store one or more various hosted applications, while in other instances, the server 103 may be a dedicated server meant to store and execute only a single hosted application (e.g., the form repeater UIBB 104 or the substitute UIBB 105). In some instances, the server 103 may include a web server, where the hosted applications represent one or more web-based applications accessed and executed via network by the clients 135 to perform the programmed tasks or operations of the hosted application.

At a high level, the server 103 includes an electronic computing device operable to receive, transmit, process, store, or manage data and information associated with the environment 100. For example, the illustrated server 103 may be responsible for receiving application requests from one or more client applications associated with the clients 135 of the environment 100 and responding to the received requests by processing said requests in an associated hosted application, and sending the appropriate response from the hosted application back to the requesting client application. In addition to requests from the illustrated clients 135, requests associated with the hosted applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 103 for the enterprise computing system 102, environment 100 can be implemented using two or more servers 103, as well as computers other than servers, including a server pool. Indeed, server 103 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 103 may be adapted to execute any operating system, including Linux, UNIX, Windows, Mac OS, or any other suitable operating system.

As mentioned above, the server 103 includes the form repeater UIBB 104 and the substitute UIBB 105. The form repeater UIBB 104, the substitute UIBB 105, or both, manage user interface building blocks (UIBB). Specifically, the form repeater UIBB 104 presents initial UI representations of structured entities. In response to receiving a trigger associated with a particular structured entity, an event condition is determined, and a "swapping in" of a substitute UI representation for the particular structured entity, by the substitute UIBB 105, or "swapping out" of the substitute UI representation for the particular structured entity is performed, described further below. The form repeater UIBB 104 and the substitute UIBB 105 can be implemented by and stored by any combination of the enterprise computing system 102, the host computing system 125, the repository 130, or the clients 135.

The illustrated server 103 also includes an interface 117, a processor 118, and a memory 120. The interface 117 is used by the server 103 for communicating with other systems in a distributed environment—including within the environment 100—connected to the network 115; for example, the clients 135, as well as other systems communicably coupled to the network 115. Generally, the interface 117 includes logic encoded in software and/or hardware in a suitable combination and operable to communicate with the network 115. More specifically, each interface 117 may include software supporting one or more communication protocols associated with communications such that the network 115 or interface's hardware is operable to communicate physical signals within and outside of the illustrated environment 100.

As illustrated in FIG. 1, the server 103 includes the processor 118. Although illustrated as a single processor 118 in FIG. 1, two or more processors may be used according to particular needs, desires, or particular embodiments of the environment 100. The processor 118 may be a central processing unit (CPU), a blade, an application specific integrated circuit (ASIC), a field-programmable gate array (FPGA), or another suitable component. Generally, the processor 118 executes instructions and manipulates data to perform the operations of the server 103. For example, the processor 118 executes the functionality required to receive and respond to requests from the clients 135.

Regardless of the particular implementation, "software" may include computer-readable instructions, firmware, wired or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

The server 103 also includes a memory 120, or multiple memories 120. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise computing system 102. Additionally, the memory 120 may include any other appropriate data, such as VPN applications, firmware logs and policies, firewall policies, a security or access log, print or other reporting files, as well as others.

The memory 120 can further include initial UI representations 150 of the structured entities and substitute UI representations 155 of the structured entities. The form repeater UIBB 104 provides (or operates on) the initial UI representations 150 such that each UI representation 150 is presented visually underneath each other. The initial UI representations 150 and the substitute UI representations 155 can further include (or be associated with) fields 160. The fields 160 are attributes of the respective structured entities, such as a set of labeled input fields, drop down list boxes, checkboxes, text, views, or other UI elements.

In the illustrated embodiment, the initial UI representations 150, the substitute UI representations 155, and the fields 160 are stored by the memory 120 of the enterprise computing system 102. However, any subset (including each) of the initial UI representations 150, the substitute UI representations 155, and the fields 160 can be stored in any combination of the memory 120 of the enterprise computing system 102, the host computing system 125, the repository 130, and/or the clients 135. In some implementations, any subset (including each) of the initial UI representations 150, the substitute UI representation 155, and the fields 160 can be stored by a third party that provides networked online storage.

In some embodiments, the host computing system 125 can include similar (or identical) components as that of the enterprise computing system 102. For example, the host computing system 125 can include any combination (including each) of the interface 117, the processor 118, the form repeater UIBB 104, the substitute UIBB 105, and the memory 120 (including any combination of the initial UI representations 150, the substitute UI representations 155, and the fields 160). Additionally, the host computing system 125 can implement any of the methods and functionality of the enterprise computing system 102, either alone, or in cooperation/coordination with the enterprise computing system 102.

The illustrated environment of FIG. 1 also includes one or more clients 135. Each client 135 may be any computing device operable to connect to or communicate with at least the computing systems 102, 125 and/or via the network 115 using a wireline or wireless connection. In general, each client 135 includes an electronic computer device operable to receive, transmit, process, and store any appropriate data associated with the illustrated environment 100 of FIG. 1. In some examples, the client 135 are intended to encompass a personal computer, tablet computer, smart phone, cell phone, personal digital assistant (PDA), wireless data port, touch screen terminal, workstation, network computer, kiosk, one or more processors within these or other devices, or any other suitable processing device.

There may be any number of clients 135 associated with, or external to, the environment 100. For example, while the illustrated environment 100 includes three clients 135, alternative implementations of environment 100 may include a single client 135 or multiple clients 135 communicably coupled to any combination of the enterprise computing system 102, the host computing system 125, the network 115, or any other number suitable to the purposes of the environment 100. Additionally, there may also be one or more additional clients 135 external to the illustrated portion of environment 100 that are capable of interacting with the environment 100 via the network 115. Further, the term "client" and "user" may be used interchangeably as appropriate without departing from the scope of this disclosure. Moreover, while each client 135 is described in terms of being used by a single user, this disclosure contemplates that many users may use one computer, or that one user may use multiple computers.

Each illustrated client 135 may include a computer that includes an input device, such as a keypad, touch screen, mouse, or other device that can accept user information, and an output device that conveys information associated with the operation of the computing systems 102, 125 or the client 135, including digital data, visual information, or a graphic user interface (GUI) 113. The input and output device may include fixed or removable storage media such as a magnetic storage media, CD-ROM, or other suitable media to both receive input from and provide output to users of the clients 135 through the GUI 113.

The GUI 113 provides an interface to at least a portion of the environment 100 for any suitable purpose, including generating a visual representation of a web browser. Generally, through the GUI 113, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 113 can represent any graphical user interface, including but not limited to, a web browser, touch screen, or command line interface (CLI) that processes information in the environment 100 and efficiently presents the information results to the user. In general, the GUI 113 may include one or more user interface (UI) elements, some or all associated with a web browser, such as interactive fields, pull-down lists, and buttons operable by the user at the clients 135. These and other UI elements may be related to or represent the functions of the web browser. In particular, the GUI 113 may be used to view and navigate various web pages located both internal and external to the server.

In some embodiments, one or more of the clients 135 may access one or more applications hosted on the enterprise computing system 102, the host computing system 125, or both, through a portal such as an enterprise portal, also known as an enterprise information portal (EIP) or corporate portal. The web portal may be a framework for integrating information, people and processes across organizational boundaries. It provides a secure unified access point, often in the form of a web-based user interface, and is designed to aggregate and personalize information through application-specific portlets. For example, the web portal may exhibit de-centralized content contribution and content management, which keeps the information always updated. With only a web browser, users can begin work once they have been authenticated in the portal which offers a single point of access to information, enterprise applications, and services both inside and outside an organization. Enterprise portals may present information from diverse sources in a unified way, and provide additional services, such as an internal search engine, e-mail, news, and various other features. Enterprise portals are often used by enterprises for providing their employees, customers, and possibly additional users with a consistent look and feel, and access control and procedures for multiple applications, which otherwise would have been separate entities altogether The environment 100 further includes a repository 130. In some embodiments, the repository 130 is an in-memory repository. The repository 130 can be a cloud-based storage medium. For example, the repository 130 can be networked online storage where data is stored on virtualized pools of storage. In some examples, the repository 130 stores a form repeater configuration table 175. The form repeater configuration table 175 stores identification (ID) values associated with (previous) event conditions, described further below. The form repeater configuration table 175 can further include a description of one or more of the structured entities and a type of the event conditions associated with the ID values (e.g., a "swap in" or a "swap out" event). In some implementations, the form repeater configuration table 175 can be stored by any combination of the memory 120 of the enterprise computing system 102, the host computing system 125, the repository 130, and/or the clients 135. In some implementations, the form repeater configuration table 175 can be stored by a third party that provides networked online storage.

With respect to the network 115, generally, the network 115 facilitates wireless or wireline communications between the components of the environment 100 (i.e., between the computing systems 102, 125 and the clients 135), as well as with any other local or remote computer, such as additional clients, servers, or other devices communicably coupled to network 115 but not illustrated in FIG. 1. The network 115 is illustrated as a single network in FIG. 1, but may be a continuous or discontinuous network without departing from the scope of this disclosure, so long as at least a portion of the network 115 may facilitate communications between senders and recipients. The network 115 may be all or a portion of an enterprise or secured network, while in another instance at least a portion of the network 115 may represent a connection to the Internet.

In some instances, a portion of the network 115 may be a virtual private network (VPN), such as, for example, the connection between the client 135 and the computing systems 102, 125. Further, all or a portion of the network 115 can comprise either a wireline or wireless link. Example wireless links may include 802.11a/b/g/n, 802.20, WiMax, and/or any other appropriate wireless link. In other words, the network 115 encompasses any internal or external network, networks, sub-network, or combination thereof operable to facilitate communications between various computing components inside and outside the illustrated environment 100. The network 115 may communicate, for example, Internet Protocol (IP) packets, Frame Relay frames, Asynchronous Transfer Mode (ATM) cells, voice, video, data, and other suitable information between network addresses. The network 115 may also include one or more local area networks (LANs), radio access networks (RANs), metropolitan area networks (MANs), wide area networks (WANs), all or a portion of the Internet, and/or any other communication system or systems at one or more locations.

To that end, in some examples, the UIBBs are managed. Specifically, in some embodiments, the form repeater UIBB 104 presents the initial UI representations 150 of the structured entities (e.g., n initial UI representations 150 of the structured entities each at a respective index j) through a graphical user interface (GUI) (such as GUI 113). Each initial UI representation 150 of the structured entities includes one or more fields 160 related to the respective structured entity. A trigger is received from a user through the form repeater UIBB 104 via the GUI. In some examples, the trigger can be a selection of an input interface element (e.g., "clicking" a computer icon displayed on the GUI.) Based at least in part on the trigger, an event condition is determined. In some examples, the event condition can include activating the substitute UIBB 105 at a certain index (e.g., "swapping in"). Based on the event condition (e.g., activating the substitute UIBB 105), the initial UI representation 150 of a particular structured entity (e.g., at the index j) of the initial UI representations 150 of the structured entities is replaced with a substitute UI representation 155 of the particular structured entity by the substitute UIBB 105. In some examples, the substitute UI representation 155 of the particular structured entity includes additional fields 160 as compared to the initial UI representation 150 of the particular structured entity.

Specifically, in some embodiments, the form repeater UIBB 104 presents the initial UI representations 150 of the structured entities through the GUI 113 of the clients 135. For example, the form repeater UIBB 104 presents n initial UI representations 150 of the structured entities through the GUI 113 of the clients 135. Each of the UI representations 150 of the structured entities has an associated index number based on a positioning of each of the initial UI representations 150 of the structured entities with respect to the remaining initial UI representations 150 of the structured entities. For example, the "top-most" or "first" initial UI representation 150 (e.g., the initial UI representation 150 displayed at the top of the GUI as viewed by the user) can have an index value of 1, the initial UI representation 150 below the "top-most" initial UI representation 150 (as viewed by the user) can have an index value of 2, and so forth, such that the "bottom-most" or "last" initial UI representation 150 (e.g., the initial UI representation 150 displayed at the bottom of the GUI as viewed by the user) has an index value of n.

As mentioned above, each of the initial UI representations 150 include one or more fields 160 that represent attributes associated with the structured entities. In some examples, one or more of the structured entities can have differing attributes; however, each of the initial UI representations 150 include the same number of fields 160. Thus, the initial UI representations 150 have a "look and feel" of being uniform (or similar) while being associated with structured entities having a differing (and/or a differing number) of attributes. In some examples, a subset of the initial UI representations 150 of the structured entities include the same number of fields 160. In some examples, each of the initial UI representations 150 of the structured entities include a differing number of fields 160.

FIG. 2A illustrates example initial UI representations 150 of the structured entities. The form repeater UIBB 105 repeats the initial UI representations 150 for presentation by a GUI (such as the GUI 113 of the clients 135) such that each initial UI representation 150 includes the same number of fields 160. The structured entities of the initial UI representations 150 relate, in this example, to flight data. Specifically, in the example, each of the initial UI representations 150 include fields 160 relating to "Airline," "Connection Number," "Flight Date," "Plane Type," and "Maximum capacity economy class." In some examples, the fields 160 can be drop-down (or pull-down) menus such that information relating to the respective fields 160 is filled (selected by the user) with predetermined choices (e.g., for the "Airline" field 160, the airline can include AA (American Airlines) or other predetermined airlines). In some examples, the fields 160 can be user-defined inputs such that information relating to the respective fields 160 is input by the user (e.g., for the "Connection Number" field, the user inputs the connection number, such as 0017, without using predetermined choices). Further, additional example embodiments, include structured entities relating to other types of business data other than flight (or travel) data.

Referring back to FIG. 1, a trigger may receive from the user through the form repeater UIBB 104. In some examples, after the initial UI representations 150 of the structured entities are presented through the GUI (such as the GUI 113 of the clients 135), a trigger is received relating to one or more of the initial UI representations 150 of the structured entities. For example, the trigger can relate to viewing and/or editing additional "details" of a particular structured entity of the initial UI representations 150. Activation of the trigger can include selecting (e.g., "clicking") a selectable user interface element (e.g., a button or icon) associated with a particular UI representation 150 of a particular structured entity. When the trigger is received (e.g., activation of a selectable user interface element), the particular structured entity associated with the received trigger is determined. Specifically, as mentioned above, each initial UI representation 150 of the structured entities may be associated with an index value. Thus, when the trigger is received, the index value of the initial UI representation 150 of the structured entity is also determined. In some examples, the trigger can be received from (and originate from) the initial UI representation 150 associated with the particular structured entity.

In some examples, when receiving the trigger, the index value associated with the initial UI representation 150 of the particular structured entity of the trigger is determined. Specifically, as mentioned above, the initial UI representation 150 of the structured entity is associated with an index value (e.g., an index value j). In some examples, the initial UI representation 150 of the particular structured entity can be associated with two or more selectable user interface elements (such as icons) each relating to differing triggering actions. In some examples, the selectable user interface element can be associated with two or more differing triggering actions.

Referring again to FIG. 2A, the initial UI representation 150 of the particular structured entity includes a "details" icon 202. Selection of the "details" icon 202 can activate the trigger that is received (such as by the form repeater UIBB 104). To that end, upon receiving the selection of the "details" icon 202 (e.g., receiving the trigger), the index value of the initial UI representation 150 of the particular structured entity is determined. For example, the index value j is determined from the initial UI representation 150 of the particular structured entity (e.g., as shown, the initial UI representation 150 of the particular structured entity can be associated with an index value of 3 as the initial UI representation 150 of the particular structured entity is the third initial UI representation 150 from the "top," as viewed by a user).

Referring back to FIG. 1, based on the (received) trigger, an event condition is determined. Specifically, the event condition can relate to an event that is to occur and is associated with one or more of the initial UI representations 150 of the structured entities. In some examples, the event condition can include a "swapping in" of the substitute UI representation 155 or a "swapping out" of the substitute UI representation 155. Specifically, upon selection of the trigger (e.g., selecting the selectable user interface element), the event condition associated with the trigger is determined. In some embodiments, the form repeater UIBB 104 determines the event condition.

In some examples, when determining the event condition, the index value of the initial UI representation 150 of the particular structured entity associated with the trigger of the event condition is identified. Thus, the event condition (such as "swapping in" or "swapping out" a substitute UI representation 155) is provided (e.g., performed) at the initial UI representation 150 of the particular structured entity associated with the identified index value. In some examples, the specific event includes "swapping in" of a substitute UI representation 155 that is related to the particular structured entity to replace the initial UI representation 150 of the particular structured entity, described further below. In some examples, the specific event includes "swapping out" of the substitute UI representation 155 (when the GUI includes the substitute UI representation 155) and replacing the substitute UI representation 155 with the initial UI representation 155 of the particular structured entity, described further below. In some examples, the event condition associated with the trigger can relate to events of two or more structured entities. Thus, the event condition that is based on receiving the trigger can be an event condition (e.g., the "swapping" event) relating to two or more initial UI representations 150, two or more substitute UI representations 155, or a combination thereof.

In some embodiments, an event condition identification (ID) associated with the trigger is determined (or identified). The event condition ID is associated with a specific event (e.g., the swapping event) for the initial UI representation 150 (or the substitute UI representation 155) of a particular structured entity associated with the trigger. The event condition ID is matched to an ID value associated with the event condition that is stored in the form repeater configuration table 175. In some examples, matching the event condition ID to the ID value stored by the form repeater configuration table 175 can include providing a matching value between the event condition ID to the stored ID value. When the matching value between the event condition ID and the stored ID value is above (or equal) to a matching threshold, the event condition ID and the stored ID value are deemed to be matched. When the matching value between the event condition ID and the stored ID value is below a matching threshold, the event condition ID and the stored ID value are not deemed to be matched (or, in some embodiments, deemed to be not matched). In some examples, matching between the event condition ID and the stored value ID can be partial or direct (full) matching. In some examples, the event condition ID can be matched to two or more stored ID values. In some examples, the stored ID value can be matched to two or more event condition IDs. In some examples, the event condition ID can be any representation such as numerals, letters, or any other type of identifier.

Based on the match between the event condition ID and the ID value stored in the form repeater configuration table 175, the event condition is determined (that is associated with the trigger). For example, when the matching value between the event condition and the ID value is above (or equal to) the matching threshold, the event condition that is associated with the ID value stored by the form repeater configuration table 175 is determined. In some examples, the event condition is also stored by the from repeater configuration table 175. In some embodiments, the form repeater UIBB 104, the substitute UIBB 105, or both, determine the event condition ID, matches the event condition to the stored ID value, and determines the event condition based on the match.

In some embodiments, the form repeater configuration table 175 can store (or facilitate storing) multiple pieces of information related to the stored ID value. For example, the form repeater configuration table 175 can store a description of the substitute UI representation 155 that is associated with the trigger and the event condition ID. The description of the substitute UI representation 155 can include a component name, a window name, a configuration name, and an instance ID. The form repeater configuration table 175 can also store the ID value associated with one or more event conditions. Additionally, the form repeater configuration table 175 can also store a type of the event condition. For example, the event condition can be "swapping in" or "swapping out" of the substitute UI representation 155 for a particular structured entity. The form repeater configuration table 175 can also store an event condition, such as an origination of the trigger. For example, the trigger associated with the initial UI representation 150, or a trigger associated with the substitute UI representation 155.

Referring to FIG. 3, FIG. 3 illustrates the form repeater configuration table 175. The form repeater configuration table 175 includes a standard attributes section 302, and a swap event section 304. The standard attributes section 302 includes a listing of attributes of the substitute UIBB 150, such as the component name, the window name, the configuration name, and the instance ID. The swap events section 304 includes a table 306 including an event (condition) ID column 308, a swap type column 310, and an event condition column 312. Thus, for each event (condition) ID, a swap type (e.g., a "swap in" or a "swap out") via the swap type column 310 is associated with the event ID. Also, for each event (condition) ID, an event condition (e.g., a condition defined as "raised by own UIBB (the initial UI representation 150 or the form repeater UIBB 104)" or defined as "raised by own Swap UIBB (the substitute UI representation 155 or the substitute UIBB 105)") via the event condition column 312 is associated with the event ID.

Referring back to FIG. 1, based at least in part on the event condition, the initial UI representation 150 of the particular structured entity of the initial UI representations 150 of the structured entities is replaced, by the substitute UIBB 105, with a substitute UI representation 155 of the particular structured entity. Specifically, when the trigger associated with initial UI representation 150 of the particular structured entity is activated (e.g., the selectable user interface element is selected), the event condition is determined to be a "swapping in" of the substitute UI representation 155 of the particular structured entity at an index of the particular structured entity. For example, as mentioned above, when receiving the trigger, the index value (e.g., an index value j; $0 \leq j \leq n$) of the initial UI representation of the particular structured entity associated with the trigger is identified (or determined). To that end, the initial UI representation 150 of particular structured entity at the identified index value is removed (based on the event condition being a "swapping in" of the substitute UI representation 155 of the particular structured entity) from the GUI. Additionally, the substitute UI representation 155 is provided at (or positioned at) the identified index value (e.g., index value j). Thus, the GUI is generated (e.g., rendered) with the substitute UI representation 155 of the particular structured entity at the identified index value and at least portion of the initial UI presentations 150 of the structured entities. Furthermore, when replacing the initial UI representation 150 of the particular structured entity with the substitute UI representation 155, the remaining initial UI representations 150 are unchanged. Specifically, the remaining initial UI representations 150 are not replaced with substitute UI representations 155. Thus, the "look and feel" of the remaining initial UI representations 150 of the structured entities remains the same (or similar) to the user.

In some examples, the substitute UI representation 155 of the particular structured entity is provided at the identified index value concurrently with removing the initial UI representation 150 of the particular structured entity at the identified index value. In some examples, the substitute UI representation 155 of the particular structured entity is provided at the identified index value after removing the initial UI representation 150 of the particular structured entity at the identified index value.

As an example, prior to replacing the initial UI representation 150 of the particular structured entity with the substitute UI representation 155, the GUI includes n initial UI representations 150 of the structured entities each at respective index values j (e.g., at values 1 to n). After replacing the initial UI representation 150 of the particular structured entity with the substitute UI representation 155 at the identified index value of j, the GUI includes the initial UI representations 150 of the structured entities that were previously included by the GUI at indexes 1 to j−1, the substitute UI representation 155 of the particular structured entity at the index j, and the initial UI representations 150 of the structured entities that were previously included by the GUI at indexes j+1 to n.

The substitute UI representation 155 of the particular structured entity includes the fields 160. In some examples, the substitute UI representation 155 of the particular structured entity includes one or more fields 160 that differ from the one or more fields 160 of the initial UI representation 150 of the particular structured entity. For example, the substitute UI representation 155 of the particular structured entity can include the same fields 160 that the initial UI representation 150 of the particular structured entity includes but arranged (e.g., provided for presentation) differently than the arrangement of the fields 160 of the initial UI representation of the particular structured entity. Additionally, for example, the substitute UI representation 155 of the particular structured entity can include fewer fields 160 than the initial UI representation 150 of the particular structured entity. Additionally, for example, the substitute UI presentation 155 of the structured entity can include more fields 160 than the initial UI representation 150 of the particular structured entity. In some examples, the substitute UI representation 155 of the particular structured entity can include a subset of the fields 160 included by the initial UI representation 150 of the particular structured entity. In some examples, the substitute UI representation 155 of the structured entity includes each of the fields 160 included by the initial UI representation 150 of the particular structured entity.

In some examples, the substitute UI representation 155 can relate to two or more structured entities. In some examples, the substitute UIBB 105 can include two or more other UIBBs (e.g., nested UIBBs). The nested UIBBs facilitate more complex UI building blocks. For example, the nested UIBBs that do not directly represent data (e.g., provided by a feeder class) but rather assembly other UIBBs. Such nested UIBBs are employed to realize a specific rendering (e.g., arrangement of UIBBs in tab strips or a grid), and also employed as a complex reusable UI component.

FIG. 2B illustrates an example GUI including the initial UI representations 150 and the substitute UI representation 155 of the particular structured entity. Specifically, the GUI displays the initial UI representations 150 of the structured entities at indexes 1, 2, 4 and 5 (e.g., at indexes 1 to j−1 and j+1 to n) that were previously displayed by the GUI (e.g., the GUI provided in FIG. 2A). Furthermore, the GUI displays the substitute UI representation 155 of the particular structured entity at index 3 (e.g., at index j), replacing the initial UI representation 150 of particular structured entity that was previously displayed by the GUI (e.g., the GUI provided in FIG. 2A). The substitute UI representation 155 includes the fields 160 that were previously included by the initial UI representation 150 of particular structured entity (e.g., the fields relating to "Airline," "Connection Number," "Flight Date," "Plane Type," and "Maximum capacity economy class"). Additionally, the substitute UI representation 155 of the particular structured entity includes additional fields 160 (that were not previously included by the initial UI representation 150 of the particular structured entity) that provide additional detail. The additional fields 160 relate to "Airfare," "Occupied seats economy class," "Maximum capacity business class," "Maximum capacity in first class," "Airline local currency," "Booking total," "Occupied seats business class," and "Occupied seats in first class." Similar to that mentioned above, the additional fields 160 can be drop-down (or pull-down) menus, user-defined inputs, or a combination thereof.

In some embodiments, replacing the initial UI representation 150 of the particular structured entity includes swapping the substitute UI representation 155 of the particular structured entity for the initial UI representation 150 of the particular structured entity 155 based on the type of the event. Specifically, when the event includes a "swapping in" event, the initial UI representation 150 of the particular structured entity is swapped with the substitute UI representation 155 of the particular structured entity such that the substitute UI representation 155 of the particular structured entity is provided at the index of the particular structured entity. When the event includes a "swapping out" event, the substitute UI representation 155 of the particular structured entity is swapped with the initial UI representation 150 of the particular structured entity such that the initial UI representation 150 of the particular structured entity is provided at the index of the particular structured entity. In some embodiments, the form repeater UIBB 104, the substitute UIBB 105, or both, swap the substitute UI representation 155 of the particular structured entity with the initial UI representation 150 of the particular structured entity 155 based on the type of the event.

In some embodiments, the substitute UI representation 155 of the particular structured entity includes at least one modifiable field 160, and at least a portion of the one or more fields 160 of each initial UI representation 150 of the structured entities are non-modifiable fields 160. For example, the modifiable fields 160 can include the ability to receive user input such that the user can edit the data associated with the modifiable fields 160. In some examples, the non-modifiable fields 160 prevent the user from providing user input to edit the data associated with the non-modifiable fields 160. Thus, the non-modifiable fields 160 are "locked" to secure the integrity of the data associated with the non-modifiable fields 160.

In some additional embodiments, a second trigger is received from the user through (using) the form repeater UIBB 104. In some examples, after the substitute UI representation 155 of the particular structured entity is presented, a second trigger is received relating to the substitute UI representation 155 of the particular structured entity. For example, the second trigger can relate to closing (e.g., removing) the additional "details" of the substitute UI representation 155 of the particular structured entity. Activation of the trigger can include selecting (e.g., "clicking") a selectable user interface element (e.g., a button or icon) associated with the substitute UI representation 155 of the particular structured entity. The index value associated with the particular structured entity is determined. In some embodiments, the form repeater UIBB 104 receives the second trigger.

Referring again to FIG. 2B, the substitute UI representation 155 includes a "close details" icon 204. Selection of the "close details" icon 204 can activate the second trigger that is received (such as by the form repeater UIBB 104, the substitute UIBB 105, or both). In some embodiments, upon receiving the selection of the "close details" icon 204 (e.g., receiving the second trigger), the index value of the substitute UI representation 155 of the particular structured entity is determined. Alternatively, in some embodiments, determination of the index value may not be predicated on receiving the selection of the "close details" icon 204. For example, when one line is "swapped," the event condition may be defined such that the form repeater UIBB 104 reacts on a specific event ID only of the substitute UIBB 105. Then the substitute UIBB 105 is closed and all entities are represented by the initial UI representation 150.

In some embodiments, the index value j is determined for the substitute UI representation 155 of the particular structured entity (e.g., as shown, the substitute UI representation 155 of the particular structured entity can be associated with an index value of 3 as the substitute UI representation 155 of the particular structured entity is the third UI representation from the "top," as viewed by a user).

Referring back to FIG. 1, based on the (received) second trigger, a second event condition is determined. The event condition can relate, for example, to "swapping out" of the substitute UI representation 155 of the particular structured entity. Specifically, upon selection of the second trigger (e.g., selecting the selectable user interface element), the second event condition associated with the second trigger is determined. In some embodiments, the form repeater UIBB 104, the substitute UIBB 105, or both, determine the second event condition.

In some examples, when determining the second event condition, the index value of substitute UI representation 155 of the particular structured entity associated with the second trigger of the second event condition is identified. Thus, the second event condition ("swapping out" of the substitute UI representation 155 of the particular structured identity) is provided (e.g., performed) at the particular structured identity associated with the identified index value. In some examples, the specific event includes "swapping out" of the substitute UI representation 155 and replacing the substitute UI representation 155 with the initial UI representation 150 of the particular structured entity, described further below.

Based on the second event condition, the substitute UI representation 155 of the particular structured entity is replaced with the initial UI representation 150 of the particular structured entity by the form repeater UIBB 104. Specifically, when the second trigger associated with the particular structured entity is activated (e.g., the selectable user interface element is selected), the second event condition is determined to be a "swapping out" of the substitute UI representation 155 of the particular structured entity at the index and replacing the substitute UI representation 155 of the particular structured entity with the initial UI representation 150 of the particular structured entity at the index. For example, as mentioned above, when receiving the second trigger, the index value (e.g., an index value j; 0≤j≤n) of the substitute UI representation 155 of the particular structured entity associated with the second trigger is identified (or determined). To that end, the substitute UI representation 155 of the particular structured entity at the identified index value is removed (based on the event condition being a "swapping out" of the substitute UI representation 155). Additionally, the initial UI representation 150 of the particular structured entity is provided at (or positioned at) the identified index value (e.g., index value j). Thus, the initial UI representation 150 of the particular structured entity is generated (e.g., rendered) at the identified index value. Also, at least a portion of the previously presented initial UI representations 150 are generated (e.g., rendered). Furthermore, when replacing the substitute UI representation 155 of the particular structured entity with the initial UI representation 150 of the particular structured entity, the remaining initial UI representations 150 of the structured entities may remain unchanged. Specifically, the remaining UI representations 150 of the structured entities may not be replaced with other substitute UI representations 155. Thus, the "look and feel" of the remaining initial UI representations 150 of the structured entities remains visually the same (substantially or identical) to the user. In some embodiments, the form repeater UIBB 104 replaces the substitute UI representation 155 of the particular structured entity with the initial UI representations 150 of the particular structured entity.

In some examples, the initial UI representation 150 of the particular structured entity is provided at the identified index value concurrently with removing the substitute UI representation 155 of the particular structured entity at the identified index value. In some examples, the initial UI representation 150 of the particular structured entity is provided at the identified index value after removing the substitute UI representation 155 of the particular structured entity at the identified index value.

Figure 4B:
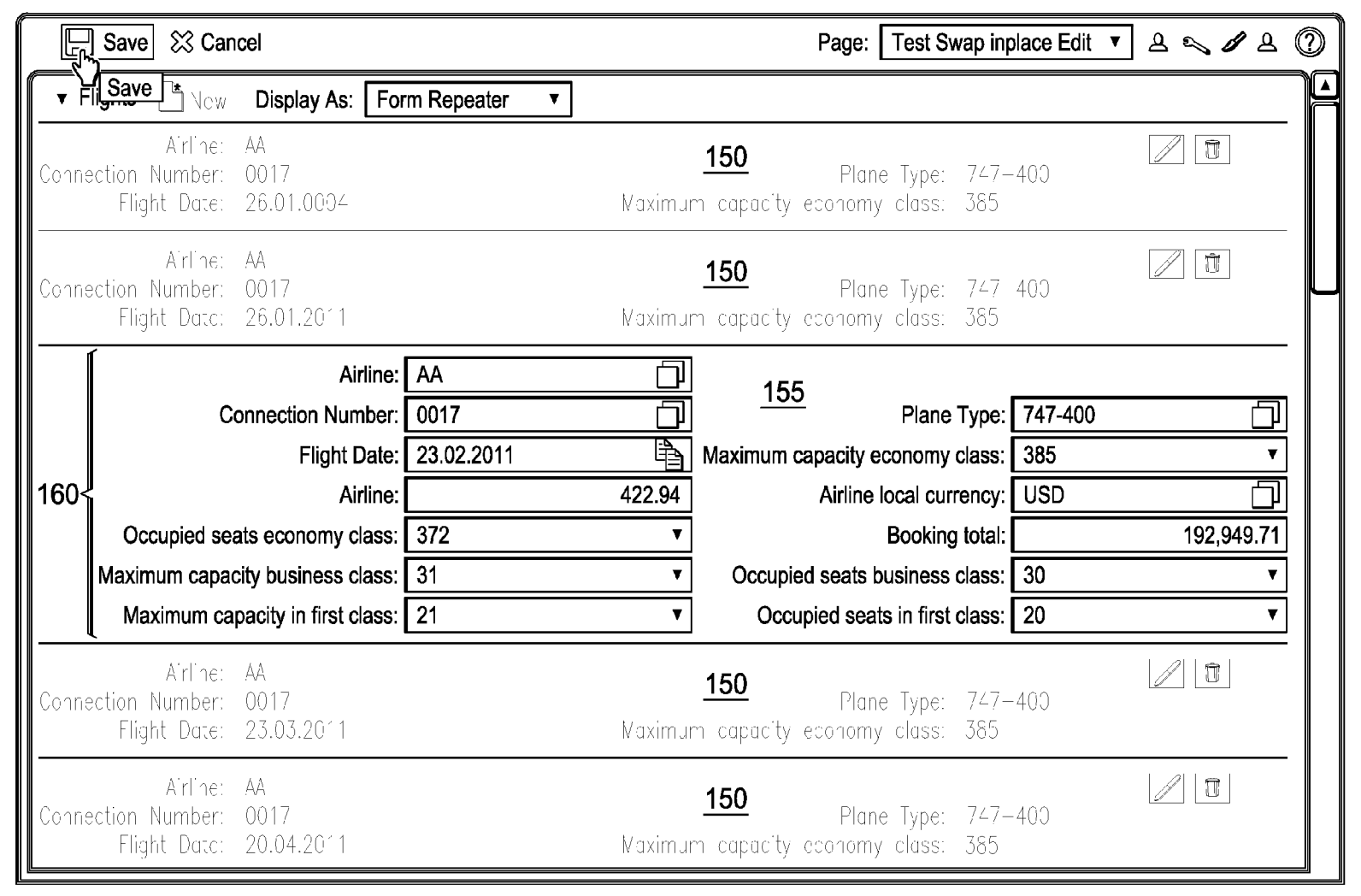

FIGS. 4A-4B illustrate other example UI representations of structured entities. Specifically, FIGS. 4A-4B illustrate UI representations of interdependent structured entities. By including the UI representations of interdependent structured entities, only a subset (e.g., one) of the UI representations of the structured entities can be associated with an event condition (e.g., a "swapping in" or a "swapping out" of a substitute UI representation 155) at a particular time. More specifically, by including the interdependent structured entities, only a subset (e.g., one) of the UI representations of the structured entities can be edited (i.e., editing the values associated with the fields 160) at a particular time. In some examples, changes to the fields 160 of multiple UI representations of the structured entities cannot be processed properly in a single processing transaction (e.g., by the form repeater UIBB 104, the substitute UIBB 105, or both). Specifically, changes to the fields 160 of multiple UI representations of the structured entities in a single processing transaction may result in errors in data of the fields 160 that are interdependent on one another. Thus, by allowing only a subset (e.g., one) of the UI representations of the structured entities to be editable at a particular time, errors in the data of the fields 160 are minimized, if not prevented. Additionally, by allowing on a subset (e.g., one) of the UI representations of the structured entities to be editable at a particular time, changes made to an UI representation of a particular structured entity may not replicate when changes are concurrently made to a UI representation of another structured entity that is dependent on the particular structured entity.

To that end, FIG. 4A illustrates example initial UI representations 150 of the structured entities. Similar to that mentioned above with respect to FIG. 2A, the form repeater UIBB 104 repeats the initial UI representations 150 of the structured entities for presentation by a GUI (such as the GUI 113 of the clients 135) such that each initial UI representation 150 of the structured entities includes the same number of fields 160. The example structured entities relate to flight data. Specifically, in the example, each of the initial UI representations 150 of the structured entities includes fields 160 relating to "Airline," "Connection Number," "Flight Date," "Plane Type," and "Maximum capacity economy class." Furthermore, the fields 160 are not editable (e.g., the fields 160 are "locked"). The initial UI representations 150 of the structured entities additionally include an "edit" icon 402. The "edit" icon 402 relates to editing one or more fields 160 of the particular structured entity associated with the "edit" icon 402. Specifically, upon receiving the selection of the "edit" icon 402 (e.g., receiving a trigger), the index value of the initial UI representation 150 of the particular structured entity is determined. For example, the index value k is determined (e.g., as shown, the initial UI representation 150 of the particular structured entity can be associated with an index value of 3 as the initial UI representation 150 of the particular structured entity is the third UI representation from the "top," as viewed by a user).

Referring to FIG. 4B, in response to selection of the "edit" icon 402, the substitute UI representation 155 for the particular structured entity is provided at the identified index value. Specifically, when the "edit" icon 402 is selected, the substitute UI representation 155 is "swapped in" at an index of the initial UI representation 150 of the particular structured entity associated with the "edit" icon 402. For example, as mentioned above, when the "edit" icon 402 is selected, the index value (e.g., an index value k; 0≤k≤n) of the initial UI representation 150 of the particular structured entity associated with the "edit" icon 402 is identified (or determined). To that end, the initial UI representation 150 of the particular structured at the identified index value is removed. Additionally, the substitute UI representation 155 of the particular structured entity is provided at (or positioned at) the identified index value (e.g., index value k). Specifically, the initial UI representations 150 of the structured entities are provided at indexes 1, 2, 4, and 5 (e.g., at indexes 1 to j−1 and j+1 to n) that were previously displayed by the GUI (e.g., the GUI provided in FIG. 4A). Furthermore, the substitute UI representation 155 of the particular structured entity is provided at index 3 (e.g., at index k), replacing the initial UI representation 150 of the particular structured entity that was previously displayed by the GUI (e.g., the GUI provided in FIG. 4A). Thus, when replacing the initial UI representation 150 of particular structured entity with the substitute UI representation 155 of the particular structured entity at the identified index, the remaining initial UI representations 150 of the structured entities may remain unchanged. Specifically, the remaining initial UI representations 150 of the structured entities are not replaced with substitute UI representations 155. Thus, the "look and feel" of the remaining initial UI representations 150 of the structured entities remains the same to the user. In some embodiments, the substitute UIBB 105 replaces the initial UI representation 150 of the particular structured entity with the substitute UI representation 155 of the particular structured entity.

Additionally, the substitute UI representation 155 of the particular structured entity includes the fields 160 that were previously included by the initial UI representation 150 of the particular structured entity (e.g., the fields relating to "Airline," "Connection Number," "Flight Date," "Plane Type," and "Maximum capacity economy class"). Additionally, the substitute UI representation 155 of the particular structured entity includes additional fields 160 (that were not previously included by the initial UI representation 150 of the particular structured entity). The additional fields 160 relate to "Airfare," "Occupied seats economy class," "Maximum capacity business class," "Maximum capacity in first class," "Airline local currency," "Booking total," "Occupied seats business class," and "Occupied seats in first class."

Furthermore, the fields 160 of the substitute UI representation 155 of the particular structured entity are editable. Specifically, the fields 160 can be drop-down (or pull-down) menus, user-defined inputs, or a combination thereof. Thus, the user is able to provide data to the fields 160, edit data of the fields 160, or both. In some examples, only the fields 160 of the substitute UI representation 155 of the particular structured entity are editable at a particular time. In some examples, only a subset of the fields 160 (e.g., one) of the substitute UI representation 155 of the particular structured entity are editable at a particular time.

FIG. 5A illustrates an example method for managing user interface (UI) building blocks. The example method 500 can be executed, for example, by the form repeater UIBB 104, the substitute UIBB 105, or both, using one or more computing devices. For example, any combination of the computing systems 102, 125, and the clients 135, can be used to execute the example process 500 and obtain any data from the memory of the clients 135, the computing systems 102, 125, and/or the repository 130.

In step 502, initial UI representations of the structured entities are presented, by a form user interface building block (UIBB), through a graphical user interface (GUI). Further, each initial UI representation includes one or more fields. For example, the form repeater UIBB 104 presents n initial UI representations 150 of the structured entities through the GUI (such as the GUI 113 of the clients 135). Each of the initial UI representations 150 of the structured entities include one or more fields 160 that represent attributes associated with the structure entities. In some examples, one or more of the structured entities can have differing attributes; however, each of the initial UI representations 150 of the structured entities include the same number of fields 160.

In step 504, a trigger from a user is received through the form repeater UIBB. For example, the form repeater UIBB 104 receives (e.g., from a user of the clients 135) the trigger. When the trigger is received (e.g., activation of a selectable user interface element), the initial UI representation 150 of the particular structured entity associated with the received trigger is determined. When receiving the trigger, the index value associated with the initial UI representation 150 of the particular structured entity of the trigger is determined. Specifically, as mentioned above, the initial UI representation 150 of the particular structured entity is associated with an index value (e.g., a value between 1 and n).

In step 506, an event condition is determined based on the trigger. For example, the form repeater UIBB 104 determines the event condition based on the trigger. When the trigger associated with the initial UI representation 150 of the particular structured entity is activated (e.g., the selectable user interface element is selected), the event condition is determined to be a "swapping in" of the substitute UI representation 155 of the particular structured entity at an index of the initial UI representation 150 of the particular structured entity.

In step 508, based on the event condition, the initial UI representation of the particular structured entity is replaced, by a substitute UIBB, with a substitute UI representation of the particular structured entity. For example, the substitute UIBB 105 replaces the initial UI representation 150 of the particular structured entity with the substitute UI representation 155 of the particular structured entity. When the trigger associated with the initial UI representation 150 of the particular structured entity is activated (e.g., the selectable user interface element is selected), the event condition is determined to be a "swapping in" of the substitute UI representation 155 of the particular structured entity at an index of the initial UI representation 150 of the particular structured entity. For example, as mentioned above, when receiving the trigger, the index value (e.g., an index value j; $0 \leq j \leq n$) of the initial UI representation 150 of the particular structured entity associated with the trigger is identified (or determined). To that end, the initial UI representation 150 of the particular structured entity at the identified index value is removed (based on the event condition being a "swapping in" of the substitute UI representation 155). Additionally, the substitute UI representation 155 of the particular structured entity is provided at (or positioned at) the identified index value (e.g., index value j).

In some examples, the substitute UI representation 155 of the particular structured entity includes at least one modifiable field 160, and a portion of the fields 160 of each of the initial UI representations 150 of the structured entities include a portion are non-modifiable fields 160. For example, the modifiable fields 160 can include the ability to receive user input such that the user can edit the data associated with the modifiable fields 160. The non-modifiable fields 160 prevent the user from providing user input to edit the data associated with the non-modifiable fields 160. Thus, the non-modifiable field 160 is "locked" to secure the integrity of the data associated with the non-modifiable fields 160.

In step 510, the substitute UI representation of the particular structured entity is swapped for the initial UI representation of the particular structured entity based on the type of the event. For example, the substitute UIBB 105 swaps the substitute UI representation 155 of the particular structured entity for the initial UI representation 150 of the particular structured entity based on the type of the event. When the event includes a "swapping in" event, the initial UI representation 150 of the particular structured entity is swapped with the substitute UI representation 155 of the particular structured entity such that the substitute UI representation 155 of the particular structured entity is provided at the identified index of the particular structured entity.

In step 512, the UI representations of the structured entities are rendered for display on the GUI. The UI representations include the substitute UI representation of the particular structured entity and at least a portion of the initial UI representations of the structured entities. For example, the form repeater UIBB 104, the substitute UIBB 105, or both, render the UI representations for display on the GUI 113. The substitute UI representation 155 of the particular structured entity is generated (e.g., rendered) at the identified index value and at least portion of the initial UI representations 150 of the structured entities are generated for display within a GUI (such as the GUI 113 of the clients 135). Furthermore, when replacing the initial UI representation 150 of the particular structured entity with the substitute UI representation 155 of the particular structured entity, the remaining initial UI representations 150 of the structured entities are unchanged. Specifically, the remaining initial UI representations 150 of the structured entities are not replaced with substitute UI representations 155. Thus, the "look and feel" of the remaining initial UI representations 150 of the structured entities remains the same to the user.

FIG. 5B illustrates a further example method for managing user interface (UI) building blocks. The example method 520 can be executed, for example, by the form repeater UIBB 104, the substitute UIBB 105, or both, using one or more computing devices. For example, any combination of the computing systems 102, 125, and the clients 135, can be used to execute the example process 520 and obtain any data from the memory of the clients 135, the computing systems 102, 125, and/or the repository 130.

In step 522, a second trigger is received through the form repeater UIBB. For example, the form repeater UIBB 104 receives the second trigger after the substitute UI representation 155 of the particular structured entity is provided at the identified index.

In step 524, based on the second trigger, a second event condition is determined (identified). For example, the form repeater UIBB 104, the substitute UIBB 105, or both, determine the second event condition. The event condition can relate to "swapping out" of the substitute UI representation 155 of the particular structured entity. When determining the second event condition, the index value of the particular structured entity associated with the second trigger of the second event condition is identified.

In step 526, based on the second event condition, the substitute UI representation of the particular structured entity is replaced, by the form repeater UIBB, with the initial UI representation of the particular structured entity. For example, the form repeater UIBB 104 replaces the substitute UI representation 155 of the particular structured entity with the initial UI representation 150 of the particular structured entity. When the second trigger associated with the particular structured entity is activated (e.g., the selectable user interface element is selected), the second event condition is determined to be a "swapping out" of the substitute UI representation 155 of the particular structured entity at the index and replacing the substitute UI representation 155 of the particular structured entity with the initial UI representation 150 of the particular structured entity at the identified index. For example, as mentioned above, when receiving the second trigger, the index value (e.g., an index value j; $0 \leq j \leq n$) of the substitute UI representation 155 of the particular structured entity associated with the second trigger is identified (or determined). To that end, the substitute UI representation 155 of the particular structured entity at the identified index value is removed (based on the event condition being a "swapping out" of the substitute UI representation 155). Additionally, the initial UI representation 150 of the particular structured entity is provided at (or positioned at) the identified index value (e.g., index value j).

FIG. 5C illustrates an example method for determining event conditions based on event condition IDs. The example method 540 can be executed, for example, by the form repeater UIBB 104, the substitute UIBB 105, or both, using one or more computing devices. For example, any combination of the computing systems 102, 125, and the clients 135, can be used to execute the example process 540 and obtain any data from the memory of the clients 135, the computing systems 102, 125, and/or the repository 130.

In step 542, an event condition ID associated with the trigger is determined. For example, the form repeater UIBB 104, the substitute UIBB 105, or both, determine the event condition ID associated with the trigger. The event condition ID is associated with a specific event (e.g., the swapping event) for the particular structured entity associated with the trigger.

In step 544, the event condition ID is matched to an ID value associated with the event condition stored in a form repeater configuration table. For example, the form repeater UIBB 104, the substitute UIBB 105, or both, match the event condition ID with the ID value stored in the form repeater configuration table 175. The event condition ID is matched to an ID value associated with the event condition that is stored in the form repeater configuration table 175. In some examples, matching the event condition ID to the ID value stored by the form repeater configuration table 175 can include providing a matching value between the event condition ID to the stored ID value. In some examples, the form repeater configuration table 175 can store a description of the substitute UI representation 155 that is associated with the trigger and the event condition ID; the ID value associated with one or more event conditions; and/or a type of the event condition.

In step 546, the event condition is determined based on the match between the event condition ID and the value stored in the form repeater configuration table. For example, the form repeater UIBB 104, the substitute UIBB 105, or both, determine the event condition between the event condition ID and the value stored in the form repeater configuration table 175. For example, when the matching value between the event condition and the ID value is above (or equal to) the matching threshold, the event condition that is associated with the ID value stored by the form repeater configuration table 175 is determined.

A number of implementations have been described. Nevertheless, it will be understood that various modifications may be made. For example, other methods described herein besides or in addition to that illustrated in FIGS. 5A-5C may be performed. Further, the illustrated steps of methods 500, 520, and 540 may be performed in different orders, either concurrently or serially. Further, steps may be performed in addition to those illustrated in methods 500, 520, and 540, and some steps illustrated in methods 500, 520, and 540 may be omitted without deviating from the present disclosure. Accordingly, other implementations are within the scope of the following claims.

What is claimed is:

1. A computer-implemented method for managing user interface (UI) building blocks (UIBB), the method comprising:

presenting, by a form repeater UIBB, initial UI representations of two or more structured entities through a graphical user interface (GUI), each initial UI representation of the two or more structured entities comprising one or more fields;

receiving a trigger from a user through the form repeater UIBB, the trigger associated with a particular initial UI representation of a particular structured entity of the two or more structured entities;

in response to receiving the trigger, identifying an event condition ID associated with the trigger;

matching the event condition ID to a stored ID value;

based on the matching, identifying i) a substitute UI representation of the particular structured entity, ii) an event condition, and iii) a type of the event condition, wherein the substitute UI representation of the particular structured entity includes one or more fields that differ from the one or more fields of the particular initial UI representation of the particular structured entity;

determining that the event condition identifies that an origination of the trigger is associated with the particular initial UI representation, and that the type of the event condition includes a swapping-in event condition;

based on the determination that the event condition identifies that the origination of the trigger is associated with the particular initial UI representation, and that the type of the event condition includes the swapping-in event condition, replacing, by a substitute UIBB, the particular initial UI representation of the particular structured entity of the two or more structured entities with the identified substitute UI representation of the particular structured entity;

removing the particular initial UI representation of the particular structured entity from the form repeater UIBB; and maintaining the initial UI representation of the remaining structured entities of the two or more structured entities concurrently with replacing the particular initial UI representation of the particular structured entity with the identified substitute UI representation of the particular structured entity.

2. The method of claim 1, further comprising:
rendering the UI representations of the two or more structured entities for display on the GUI, the UI representations comprising the identified substitute UI representation of the particular structured entity and at least a portion of the initial UI representations of the structured entities.

3. The method of claim 1, further comprising:
receiving an additional trigger through the form repeater UIBB, the additional trigger associated with the identified substitute UI representation of the particular structured entity of the two or more structured entities;

in response to receiving the additional trigger, identifying an additional event condition ID associated with the additional trigger;

matching the additional event condition ID to an additional stored ID value;

based on the matching, identifying i) the particular initial UI representation of the particular structured entity, ii) an additional event condition, and iii) a type of the event condition;

determining that the additional event condition identifies that an origination of the additional trigger is associated with the identified substitute UI representation, and that the type of the additional event condition includes a swapping-out event condition; and based on the determination that the additional event condition identifies that the origination of the trigger is associated with the identified substitute UI representation, and that the type of the additional event condition includes the swapping-out event condition, replacing, by the form repeater UIBB, the identified substitute UI representation of the particular structured entity with the particular initial UI representation of the particular structured entity.

4. The method of claim 1, further comprising matching the event condition ID to the stored ID value stored in a form repeater configuration table.

5. The method of claim 4, wherein the form repeater configuration table comprises:
a description of the identified substitute UI representation of the particular structured entity;
the event condition ID;
the event condition; and
the type of the event condition.

6. The method of claim 1, wherein replacing, by the substitute UIBB, the particular initial UI representation of the particular structured entity of the two or more structured entities with the identified substitute UI representation of the particular structured entity comprises swapping the identified substitute UI representation of the particular structured entity with the particular initial UI representation of the particular structured entity based on the type of the event.

7. The method of claim 1, wherein the identified substitute UI representation of the particular structured entity comprises at least one modifiable field, and at least a portion of the one or more fields of each initial UI representation of the two or more structured entities comprises non-modifiable fields.

8. The method of claim 1, further comprising:
identifying a number of attributes associated with each of the two or more structured entities; and
based on the identifying, determining that at least one of the two or more structured entities is associated with a different number of attributes that the remaining of the two or more structure entities is associated with,
wherein presenting the initial UI representations of the two or more structured entities further comprises presenting, for each structured entity, the initial UI representations of the structured entity to include a same number of fields that represent attributes associated with the structured entity.

9. The method of claim 8, wherein the identified substitute UI representation includes the same number of fields as the initial UI representations of the remaining structured entities of the two or more structured entities.

10. A non-transitory computer storage medium encoded with a computer program, the program comprising instructions for managing user interface (UI) building blocks (UIBB) that when executed by one or more computers cause the one or more computers to perform operations comprising:
presenting, by a form repeater UIBB, initial UI representations of two or more structured entities through a graphical user interface (GUI), each initial UI representation of the two or more structured entities comprising one or more fields;

receiving a trigger from a user through the form repeater UIBB, the trigger associated with a particular initial UI representation of a particular structured entity of the two or more structured entities;

in response to receiving the trigger, identifying an event condition ID associated with the trigger;

matching the event condition ID to a stored ID value;

based on the matching, identifying i) a substitute UI representation of the particular structured entity, ii) an event condition, and iii) a type of the event condition, wherein the substitute UI representation of the particular structured entity includes one or more fields that differ from the one or more fields of the particular initial UI representation of the particular structured entity;

determining that the event condition identifies that an origination of the trigger is associated with the particular initial UI representation, and that the type of the event condition includes a swapping-in event condition;

based on the determination that the event condition identifies that the origination of the trigger is associated with the particular initial UI representation, and that the type of the event condition includes the swapping-in event condition, replacing, by a substitute UIBB, the particular initial UI representation of the particular structured entity of the two or more structured entities with the identified substitute UI representation of the particular structured entity;

removing the particular initial UI representation of the particular structured entity from the form repeater UIBB; and maintaining the initial UI representation of the remaining structured entities of the two or more structured entities concurrently with replacing the particular initial UI representation of the particular structured entity with the identified substitute UI representation of the particular structured entity.

11. The non-transitory computer storage medium of claim 10, wherein the operations further comprise:

rendering the UI representations of the two or more structured entities for display on the GUI, the UI representations comprising the identified substitute UI representation of the particular structured entity and at least a portion of the initial UI representations of the structured entities.

12. The non-transitory computer storage medium of claim 10, wherein the operations further comprise:

receiving an additional trigger through the form repeater UIBB, the additional trigger associated with the identified substitute UI representation of the particular structured entity of the two or more structured entities;

in response to receiving the additional trigger, identifying an additional event condition ID associated with the additional trigger;

matching the additional event condition ID to an additional stored ID value;

based on the matching, identifying i) the particular initial UI representation of the particular structured entity, ii) an additional event condition, and iii) a type of the event condition;

determining that the additional event condition identifies that an origination of the additional trigger is associated with the identified substitute UI representation, and that the type of the additional event condition includes a swapping-out event condition; and based on the determination that the additional event condition identifies that the origination of the trigger is associated with the identified substitute UI representation, and that the type of the additional event condition includes the swapping-out event condition, replacing, by the form repeater UIBB, the identified substitute UI representation of the particular structured entity with the particular initial UI representation of the particular structured entity.

13. The non-transitory computer storage medium of claim 10, the operations further comprising matching the event condition ID to the stored ID value stored in a form repeater configuration table.

14. The non-transitory computer storage medium of claim 13, wherein the form repeater configuration table comprises:

a description of the identified substitute UI representation of the particular structured entity;

the event condition ID;

the event condition; and the type of the event condition.

15. The non-transitory computer storage medium of claim 10, wherein replacing, by the substitute UIBB, the particular initial UI representation of the particular structured entity of the two or more structured entities with the identified substitute UI representation of the particular structured entity comprises swapping the identified substitute UI representation of the particular structured entity with the particular initial UI representation of the particular structured entity based on the type of the event.

16. The non-transitory computer storage medium of claim 10, wherein the identified substitute UI representation of the particular structured entity comprises at least one modifiable field, and at least a portion of the one or more fields of each initial UI representation of the two or more structured entities comprises non-modifiable fields.

17. A system of one or more computers comprising one or more processors and memory, the processors further configured to perform operations for managing user interface (UI) building blocks (UIBB), the operations comprising:

presenting, by a form repeater UIBB, initial UI representations of two or more structured entities through a graphical user interface (GUI), each initial UI representation of the two or more structured entities comprising one or more fields;

receiving a trigger from a user through the form repeater UIBB, the trigger associated with a particular initial UI representation of a particular structured entity of the two or more structured entities;

in response to receiving the trigger, identifying an event condition ID associated with the trigger;

matching the event condition ID to a stored ID value;

based on the matching, identifying i) a substitute UI representation of the particular structured entity, ii) an event condition, and iii) a type of the event condition, wherein the substitute UI representation of the particular structured entity includes one or more fields that differ from the one or more fields of the particular initial UI representation of the particular structured entity;

determining that the event condition identifies that an origination of the trigger is associated with the particular initial UI representation, and that the type of the event condition includes a swapping-in event condition;

based on the determination that the event condition identifies that the origination of the trigger is associated with the particular initial UI representation, and that the type of the event condition includes the swapping-in event condition, replacing, by a substitute UIBB, the particular initial UI representation of the particular structured entity of the two or more structured entities with the identified substitute UI representation of the particular structured entity;

removing the particular initial UI representation of the particular structured entity from the form repeater UIBB; and maintaining the initial UI representation of the remaining structured entities of the two or more structured entities concurrently with replacing the particular initial UI representation of the particular structured entity with the identified substitute UI representation of the particular structured entity.

18. The system of claim 17, wherein the operations further comprise:

rendering the UI representations of the two or more structured entities for display on the GUI, the UI representations comprising the identified substitute UI representation of the particular structured entity and at least a portion of the initial UI representations of the structured entities.

19. The system of claim 18, wherein the operations further comprise:

receiving an additional trigger through the form repeater UIBB, the additional trigger associated with the identified substitute UI representation of the particular structured entity of the two or more structured entities;

in response to receiving the additional trigger, identifying an additional event condition ID associated with the additional trigger;

matching the additional event condition ID to an additional stored ID value;

based on the matching, identifying i) the particular initial UI representation of the particular structured entity, ii) an additional event condition, and iii) a type of the event condition;

determining that the additional event condition identifies that an origination of the additional trigger is associated with the identified substitute UI representation, and that the type of the additional event condition includes a swapping-out event condition; and based on the determination that the additional event condition identifies that the origination of the trigger is associated with the identified substitute UI representation, and that the type of the additional event condition includes the swapping-out event condition, replacing, by the form repeater UIBB, the identified substitute UI representation of the particular structured entity with the particular initial UI representation of the particular structured entity.

20. The system of claim 17, the operations further comprising matching the event condition ID to the stored ID value stored in a form repeater configuration table.

21. The system of claim 20, wherein the form repeater configuration table comprises:

a description of the identified substitute UI representation of the particular structured entity;

the event condition ID;

the event condition; and the type of the event condition.

22. The system of claim 17, wherein replacing, by the substitute UIBB, the particular initial UI representation of the particular structured entity of the two or more structured entities with the identified substitute UI representation of the particular structured entity comprises swapping the identified substitute UI representation of the particular structured entity with the particular initial UI representation of the particular structured entity based on the type of the event.

23. The system of claim 17, wherein the identified substitute UI representation of the particular structured entity comprises at least one modifiable field, and at least a portion of the one or more fields of each initial UI representation of the two or more structured entities comprises non-modifiable fields.

\* \* \* \* \*